No. 764,805. PATENTED JULY 12, 1904.
A. J. GRAVES.
FERTILIZER DISTRIBUTER.
APPLICATION FILED NOV. 27, 1903.
NO MODEL.
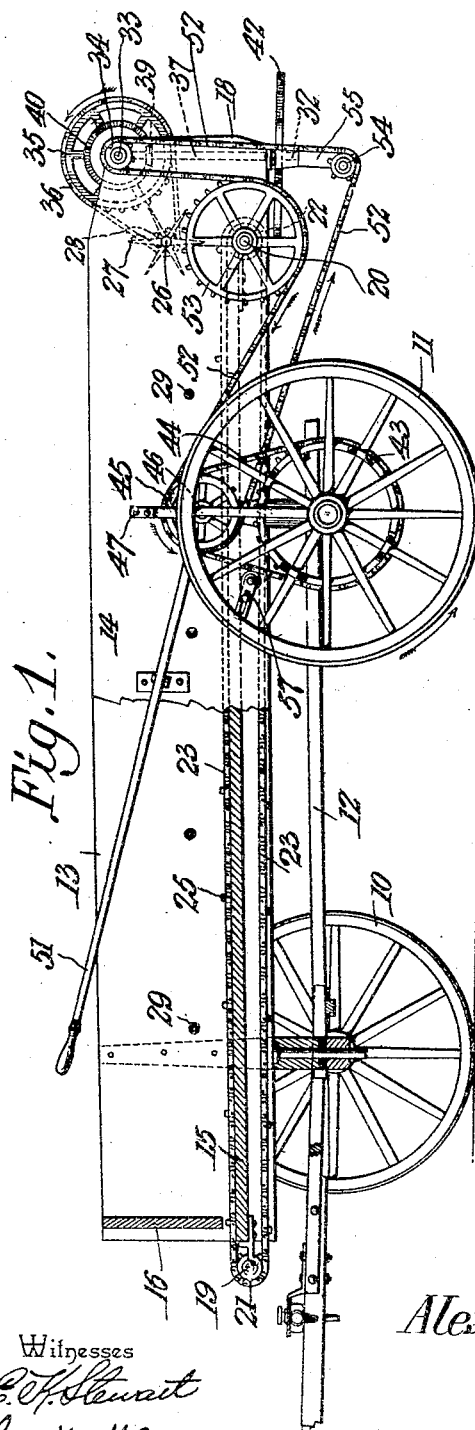
Witnesses
E. F. Stewart
C. N. Woodward
Alexander J. Graves, Inventor.
by C. A. Snow & Co.
Attorneys No. 764,805. Patented July 12, 1904.

UNITED STATES PATENT OFFICE.

ALEXANDER J. GRAVES, OF ELMO, MISSOURI.

FERTILIZER-DISTRIBUTER.

SPECIFICATION forming part of Letters Patent No. 764,805, dated July 12, 1904.

Application filed November 27, 1903. Serial No. 182,858. (No model.)

*To all whom it may concern:*

Be it known that I, ALEXANDER J. GRAVES, a citizen of the United States, residing at Elmo, in the county of Nodaway and State of Missouri, have invented a new and useful Fertilizer-Distributer, of which the following is a specification.

This invention relates to apparatus employed for distributing fertilizer material of various kinds and for similar purposes, the object being to simplify and improve devices of this character and provide novel and improved means whereby the material is finely divided and uniformly distributed; and the invention consists in certain novel features of construction, as hereinafter shown and described, and specified in the claims.

In the drawings illustrative of the invention, in which corresponding parts are denoted by like designating characters, Figure 1 is a longitudinal elevation, partially in section. Fig. 2 is a rear elevation. Fig. 3 is an enlarged sectional detail of the clutch mechanism. Fig. 4 is a plan view of the distributer member detached.

The improved device comprises a receptacle in the general form of the box or body of an ordinary farm-wagon and adapted to be placed on the running-gear of such a vehicle in place of the ordinary wagon-box, so that any ordinary farm-wagon running-gear may be adapted to support and operate the improved device. In the running-gear employed for illustration, 10 designates the forward wheels, 11 the rear wheels, and 12 the connecting means, such as the hounds and reach, and as these form no part of the present invention further description is deemed unnecessary.

The receptacle for the material to be distributed is provided with imperforate sides 13 14, floor 15, and forward closed end 16, and with an open rear end. The sides 13 14 are provided with extensions 17 18, that project beyond the rear end of the floor and support the distributing mechanism. The floor 15 is located above the lower edges of the sides 13 14, and at the ends transverse shafts 19 20 are mounted for rotation and are provided with spaced chain-pinions 21 22, around which pass endless chains 23 24, the upper leads of which run over the upper side of the floor and their lower leads beneath the floor, as shown. The chains are connected at suitable intervals by transverse slats 25, the whole forming an endless slatted carrier-belt rotative in the bottom of the receptacle and in contact therewith from the front to the rear and returning beneath the floor, a transverse slot being formed in the end 16 to permit the passage of the belt.

Mounted for rotation above the rear end of the carrier-belt is a transverse shaft 26, having its ends journaled in the sides 13 14 of the receptacle and provided with spaced radiating picker-fingers 27, disposed between the said sides, and with a chain-pinion 28 upon one end, disposed on the exterior of the side 13. The shaft 26, with the fingers 27, forms a picker-drum, which when rapidly revolved above and in contact with the material carried beneath it by the endless slatted carrier-belt disintegrates and divides the material into relatively small particles before it is discharged from the receptacle, thus to present it in better condition for distribution.

Transversely disposed within the receptacle and at suitable intervals are appropriately-spaced stop-bars 29, which are made by preference of sections of gas-piping and that aid to break up the material and prevent it from being carried in large masses to the picker-drum. By this simple expedient the travel of the material is retarded somewhat and is prevented from being carried in a mass by the carrier-belt against the picker-drum and clogging it.

Supported vertically upon the extensions 17 18 of the receptacle are standards 30 31, connected at their lower ends by a transverse member 32, and journaled transversely through the upper portion of the extensions, in vertical alinement with the member 32, is a shaft 33, having a chain-pinion 34 at one end, a chain-wheel 35 at its other end, and connecting the wheel 35 and the pinion 28 of the picker-drum shaft is a chain 36. A vertical shaft 37 is stepped at its lower end in the member 32 and is supported at its upper end by a bearing 38 on the shaft 33. The shaft 37 carries a bevel-pinion 39, with which a bevelgear 40 on the shaft 33 engages, by which means the rotation of the shaft 33 will be transmitted to the shaft 37.

Secured to the shaft 37 near its lower end and below the horizontal plane of the endless carrier-belt is a distributer member consisting of a hub 41, having a plurality of radiating and preferably curved arms 42, each arm having a longitudinal groove in its upper surface. The shaft 37 is so located relative to the receptacle and carrier-belt that the distributer rotates partially beneath the discharge end of the latter and is spaced below it, so that when the distributer is rapidly rotated in the direction of the arrow it throws the material falling upon it in all directions and scatters it uniformly over the ground.

Attached to one of the rear drive-wheels 11 is a chain-wheel 43, around which passes a chain 44 to and around a chain-wheel 45, running loose on a counter-shaft 46, supported in a bracket 47 on the side 14 of the receptacle, the counter-shaft having loosely mounted thereon a second chain-wheel 48, as clearly shown in Fig. 3. The chain-wheel 48 carries one clutch member 49, and the wheel 45 carries a similar clutch member 50, adapted to engage with the clutch member 19 when the latter is shifted by a lever 51, extended to a point convenient to the hand of the driver. An endless chain 52 passes around the chain-wheel 48, the pinion 34, a chain-wheel 53 on the rear shaft 20 of the endless slatted belt, and also around an idler-pinion 54 upon a hanger-plate 55 on the standard 31. The chain 44 is by preference engaged by an adjustable idler 57 to regulate its tension and to provide a ready means for slacking the chain when it is to be detached to release the receptacle and its attachments when they are to be removed from the running-gear 12. By this arrangement all the parts except the chain 44 and the chain-wheel 43 are either made fast to the receptacle or are rendered detachable therefrom, and by employing ordinary detachable links in the construction of the short section 44 the latter may quickly be detached if its presence is objectionable when the wagon is employed for ordinary purposes.

By the mechanism described when the receptacle is loaded, the lever 51 thrown over to engage the clutch members 49 50, and the vehicle is driven forward the motion of the wheel 11 will be transmitted to the endless slatted carrier-belt, to the picker-drum, and to the distributer, with the result that the material will be fed in small masses over the tail of the belt, at which point the rapidly-rotating picker-fingers will disintegrate the material and cause its discharge upon the rapidly-rotating distributer in finely-divided particles, whence it is thrown laterally in uniform spray-like form in equal quantities in all directions, and thus distributes the material with uniformity over the ground. When not required to distribute the material, a reverse movement of the lever 51 will disconnect all of the moving parts.

When the running-gear is required for other uses, the disconnection of the chain 44 will release it, as above stated.

The stop-bars 29 positively prevent any clogging of the picker-drum or overloading of the distributer and are therefore important features of the invention.

The parts of this apparatus are simple in construction, can be compactly and strongly constructed, and the apparatus as a whole can be manufactured cheaply and will not require a specially-constructed running-gear to support it, as any ordinary farm-wagon running-gear may be readily adapted for that purpose.

In the foregoing description is shown a preferred form of the invention; but it is not necessarily limited thereto, as modifications may be made therein without departing from the principle of the invention or sacrificing any of its advantages, and the right is therefore reserved of making all changes which may fall within its scope.

Having thus fully described my invention, what I claim is—

1. In a fertilizer-distributer the combination with a receptacle having imperforate sides and floor and an open rear end, of an endless slatted carrier-apron movable over the floor and through the rear end, means disposed above the carrier-apron for disintegrating the material as it is discharged by the apron, and a distributer constructed of radiating arms having longitudinal channels in their upper faces and mounted for horizontal rotation below and in the rear of the discharge end of the apron.

2. In a fertilizer-distributer the combination with a receptacle having imperforate sides and floor and an open rear end, of an endless slatted carrier-apron movable over the floor and through the rear end, means disposed above the carrier-apron for disintegrating the material as it is discharged by the apron, and a distributer constructed of curved radiating arms having longitudinal channels in their upper faces and mounted for horizontal rotation below and in the rear of the discharge end of the apron.

3. In a fertilizer-distributer, the combination of a receptacle for holding the fertilizer, means for moving the fertilizer to the rear end thereof, disintegrating means at the rear end of the receptacle, and a distributer constructed of radiating arms having longitudinal channels in their upper faces and mounted for horizontal rotation below and in rear of the discharge end of the fertilizer-mover.

4. In a fertilizer-distributer, the combination of a receptacle for holding the fertilizer, means for moving the fertilizer to the rear end thereof, disintegrating means at the rear end of the receptacle, a distributer constructed of curved radiating arms having longitudinal channels in their upper faces and mounted for horizontal rotation below and in the rear of the discharge end of the fertilizer-mover, and means for actuating the said mover and distributer.

In testimony that I claim the foregoing as my own I have hereto affixed my signature in the presence of two witnesses.

ALEXANDER J. GRAVES.

Witnesses:
FRANK HOOKER,
F. MEREDITH.